US008413548B2

(12) United States Patent
Redmond et al.

(10) Patent No.: US 8,413,548 B2
(45) Date of Patent: Apr. 9, 2013

(54) GRASPING DEVICE FOR DRILL

(76) Inventors: Debbie Redmond, Arvada, CO (US);
Charlie Redmond, Arvada, CO (US)

( * ) Notice: Subject to any disclaimer, the term of this patent is extended or adjusted under 35 U.S.C. 154(b) by 376 days.

(21) Appl. No.: 12/717,904

(22) Filed: Mar. 4, 2010

(65) Prior Publication Data

US 2011/0214537 A1    Sep. 8, 2011

(51) Int. Cl.
| | |
|---|---|
| *B25B 13/00* | (2006.01) |
| *B25B 13/06* | (2006.01) |
| *B25B 13/02* | (2006.01) |
| *B25B 23/14* | (2006.01) |
| *B23G 1/46* | (2006.01) |
| *B23B 41/00* | (2006.01) |
| *B23B 51/00* | (2006.01) |
| *B23B 31/00* | (2006.01) |
| *B23B 31/10* | (2006.01) |
| *B23B 31/02* | (2006.01) |
| *F16B 45/00* | (2006.01) |
| *B25G 3/02* | (2006.01) |

(52) U.S. Cl.
USPC ............... 81/52; 81/121.1; 81/119; 81/467; 297/143; 408/240; 408/80; 408/197; 408/239 A; 408/239 R; 411/400; 279/35; 279/36; 279/143; 279/144; 279/145; 7/158

(58) Field of Classification Search .............. 81/52, 119, 81/121.1, 467; 297/143; 408/80, 197, 239, 408/240; 7/158; 411/400; 279/35, 36
See application file for complete search history.

(56) References Cited

U.S. PATENT DOCUMENTS

| | | | | |
|---|---|---|---|---|
| 553,226 | A | * | 1/1896 | Brockett .................... 279/35 |
| 882,937 | A | | 8/1908 | Fegley |
| 1,818,353 | A | * | 8/1931 | Rolstad ...................... 81/13 |
| 4,357,845 | A | | 11/1982 | Cornia |
| 4,669,932 | A | * | 6/1987 | Hartley .................. 408/239 R |
| D298,730 | S | | 11/1988 | Zinn |
| D319,171 | S | | 8/1991 | McCord, Jr. |
| D319,764 | S | | 9/1991 | McCord, Jr. |
| D319,765 | S | | 9/1991 | McCord, Jr. |
| D320,542 | S | | 10/1991 | McCord, Jr. |
| 5,335,569 | A | | 8/1994 | Rowley |
| 5,439,338 | A | | 8/1995 | Rosenberg |
| 5,531,549 | A | * | 7/1996 | Fossella .................... 408/240 |
| 376,520 | A | | 12/1996 | Morin |
| 5,622,090 | A | | 4/1997 | Marks |
| 5,697,268 | A | | 12/1997 | Makovsky |
| 5,791,208 | A | | 8/1998 | Grubbs |
| 6,026,715 | A | | 2/2000 | Hu |
| 6,230,592 | B1 | | 5/2001 | Hsiao |
| 6,374,707 | B1 | | 4/2002 | Browning |
| 6,550,786 | B2 | * | 4/2003 | Gifford et al. ............... 279/75 |
| 6,626,068 | B2 | | 9/2003 | McKivigan |
| 6,711,974 | B1 | | 3/2004 | Lin |
| 6,729,210 | B2 | | 5/2004 | Morris |
| 6,854,364 | B1 | | 2/2005 | Tassano |

(Continued)

*Primary Examiner* — Monica Carter
*Assistant Examiner* — Danny Hong
(74) *Attorney, Agent, or Firm* — Albert Haegele; Leyendecker & Lemire, LLC (57) ABSTRACT

A grasping device comprising a grasping assembly coupled to a shaft adapted to fit into a drill chuck is described. Embodiments of the grasping device are capable of grasping objects such as a screw head, a bolt head, a hex nut, a wing nut, a hook, or other irregularly shaped objects, so that such objects can be turned by an electric drill, lathe, or similar machine tool.

6 Claims, 9 Drawing Sheets

U.S. PATENT DOCUMENTS 7,191,723 B1 3/2007 Bradford
7,430,944 B1 10/2008 Miller
D594,305 S 6/2009 Gyder
2005/0132848 A1 6/2005 Tassano
2006/0169108 A1 8/2006 Boone

* cited by examiner

GRASPING DEVICE FOR DRILL

FIELD OF THE INVENTION

The present invention relates generally to grasping or clamping devices adapted to fit in a chuck and to be rotated by a drill or similar machine tool.

BACKGROUND

Various attachments are used in drills to twist or rotate screws, nuts, bolts, lags, and similar threaded fasteners. However, such attachments tend to be highly specific and poorly adapted for engaging fasteners or other items not having a highly specific size and shape. Thus a drill attachment for a 6 mm hex nut typically will not work for driving a different size hex nut, nor for phillips or slot head screws of any size. Similarly, an attachment for phillips head screws will typically be ill adapted to engage a torx head, an allen head, a wing nut, or any item not having a phillips type receptacle.

Numerous drill attachments for driving threaded hooks with are known, but typically fit hooks within relatively narrow ranges of size and shape, and drill attachments for grasping or engaging other irregularly shaped objects are scarce. Moreover, most drill attachments do not enable pulling on an object while twisting or rotating the object.

DETAILED DESCRIPTION

Embodiments of the present invention include grasping devices comprising grasping or clamping assembly coupled to a shaft adapted to fit in a drill chuck. The shaft is typically round, with a diameter of about ¼ inch (adapted for use with a ¼ drill) to about ½ inch (adapted for use with a ½ inch drill). In some embodiments, the shaft comprises a hexagonal section, with a distance between opposite sides of the hexagonal section typically being about ¼ inch to about ½ inch. In some embodiments, grasping devices have shafts larger than ½ inch and smaller than ¼ inch.

For instance, embodiments adapted for use in a Dremel™ tool have shafts about ⅛ inch in diameter, and embodiments adapted for use in industrial drill presses or lathes can have shafts of an inch or greater in diameter.

The grasping or clamping assembly typically includes opposing jaws adapted to pinch, grasp, clamp, or otherwise gain purchase on an object through an action of the opposing jaws coming together. The action of the opposing jaws coming together facilitates gaining purchase on objects of varied size and shape. In some embodiments, multiple sets of jaws can be readily interchangeably installed on a grasping device. Thus one grasping device can be adapted to grasp a wider variety of objects by installing jaws selected from a set of jaws having varied size and shape. The interchangeable jaws can be readily removed or replaced by a user, who is not limited by jaws originally installed on the grasping device.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The term "removable," "removably coupled," "readily removable," and similar terms, as used in this specification and appended claims, refer to structures that can be uncoupled from an adjoining structure with relative ease, i.e. non-destructively and without complicated or time consuming process, and can also be readily reattached or coupled to the previously adjoining structure. Interchangeable structures are by definition removable.

The term "diametrically opposed," as used in this specification and appended claims, refers to structures of a grasping device, typically jaws or pincers, that are disposed one each on opposite ends of a diameter of a circle. Thus the structures are disposed 180° apart on the circle. Diametrically opposed jaws are typically adapted to move or pivot toward and away from each other. The circle has a center that resides approximately along a longitudinal axis of a grasping device shaft.

The term "chuck," as used in this specification and appended claims, refers to a device familiar to persons skilled in the art, adapted to clamping and centering an object in a rotational machine tool. A rotational machine tool is a machine tool such as a lathe or drill, adapted to rotate a work piece.

A First Embodiment Grasping Device

Figure 1:
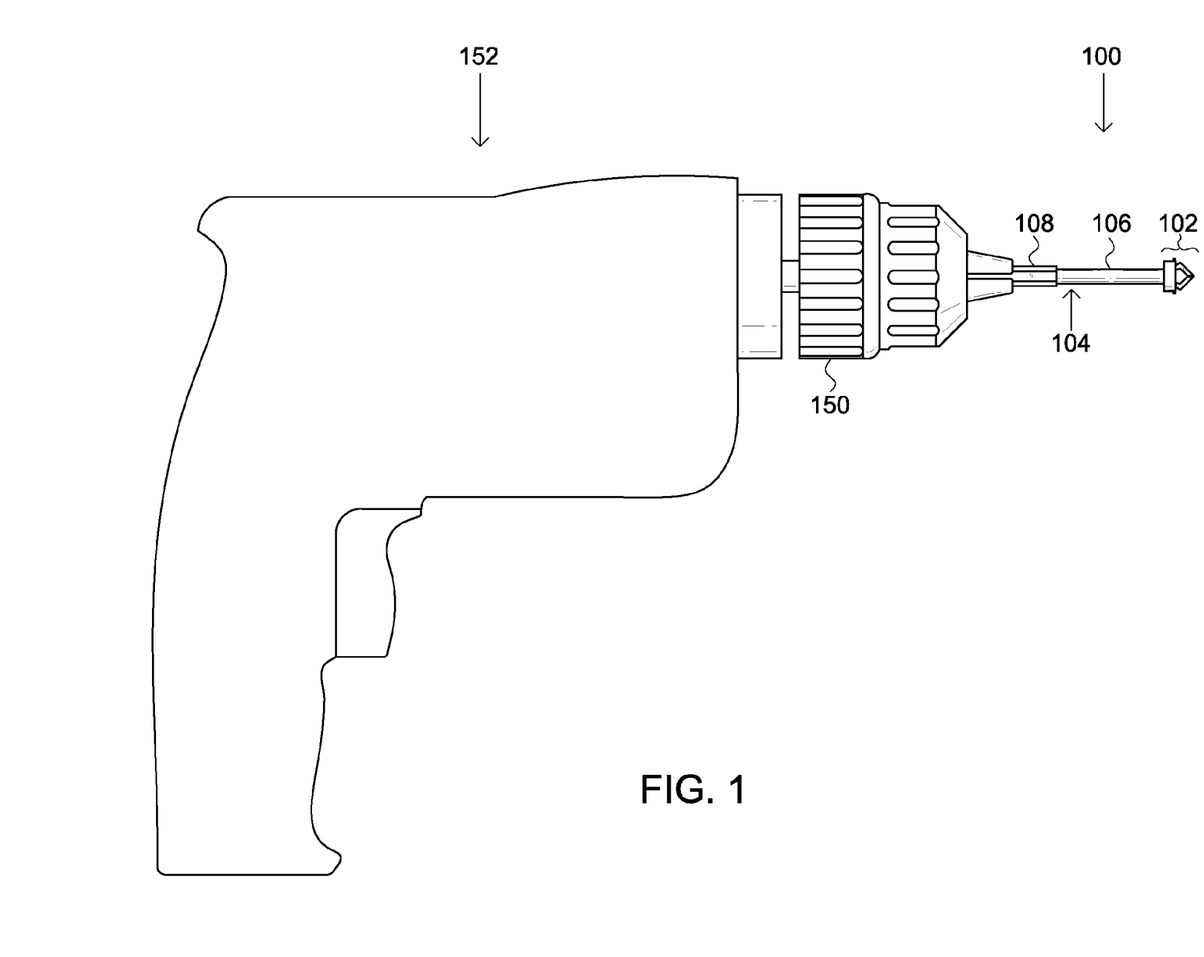
FIG. 1 is a side, plan view of a grasping device for a drill, according to one embodiment of the present invention.

A first embodiment grasping device 100 is illustrated in FIG. 1. The first embodiment grasping device is installed in a drill chuck 150 of an electric drill 152, the electric drill being adapted to receive in its chuck a shaft having a maximum diameter of approximately ⅜ inch. Such a drill is commonly referred to as a ⅜ inch drill. The grasping device 100 comprises a grasping assembly 102 coupled to a shaft 104. The shaft comprises a cylindrical section 106 and a hexagonal section 108. The cylindrical section has a diameter of approximately ¼ inch and the hexagonal section is approximately ⅜ inch across. Operation of the drill rotates the shaft about a shaft longitudinal axis. Accordingly, the shaft longitudinal axis and shaft rotational axis are one and the same where the shaft is installed in the drill chuck.

The shaft 104 has been secured in the drill chuck 150 by tightening the chuck on the shaft by hand, the chuck being a keyless chuck. In some embodiments, keyed chucks are used, which require using a chuck key to tighten the chuck on a grasping device shaft. Embodiments of the grasping device have shafts that are preferably at least one inch long, more preferably between one inch and eight inches long, and most preferably about 2.5 inches long. The shaft of the first embodiment grasping device is about 2.5 inches long. In some embodiments, the shaft is ten or more inches in length, which facilitates reaching into relatively inaccessible spaces with the grasping device.

Figure 2A:
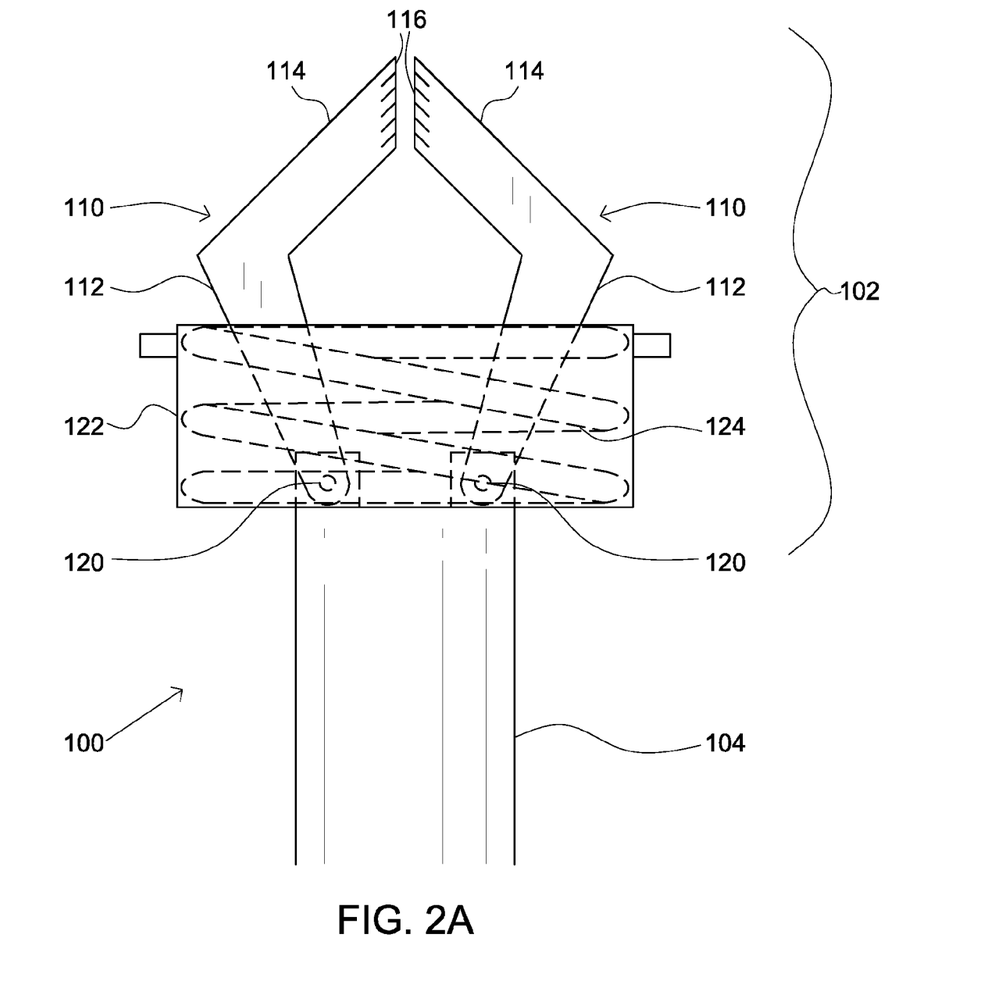
FIG. 2A is a side, plan view of a grasping device for a drill, according to one embodiment of the present invention.
Figure 2B:
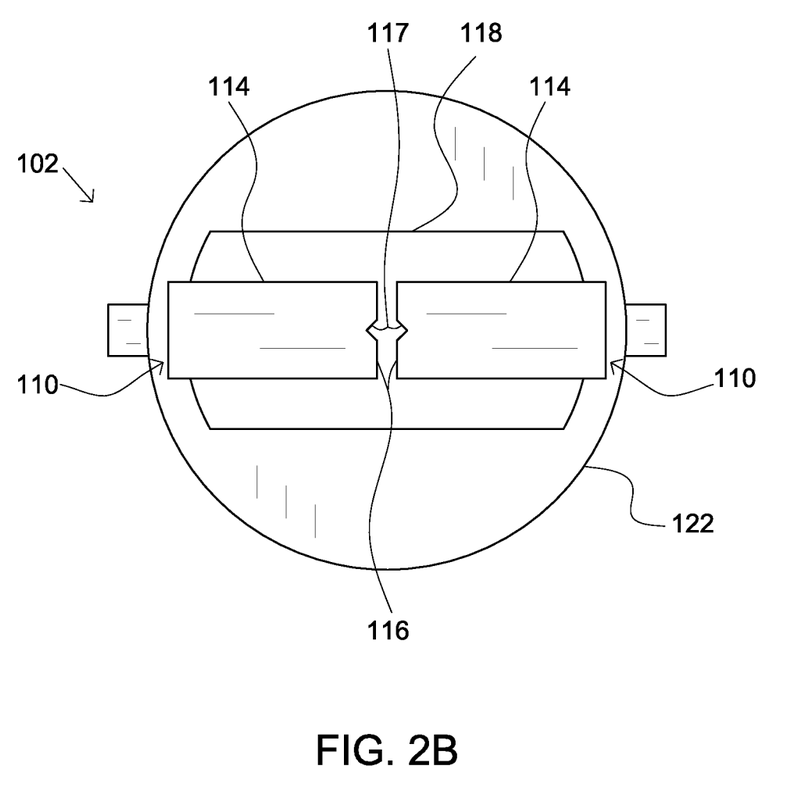
FIG. 2B is an end, plan view of a grasping device for a drill, according to one embodiment of the present invention.

The grasping assembly 102, best illustrated in FIGS. 2A and 2B, comprises two jaws 110 coupled to the shaft by roll pins 120. The jaws are disposed diametrically opposed on the grasping assembly. Each of the jaws comprises a base section 112 and a tip section 114, and is adapted to pivot about its roll pin 120. The roll pins are substantially parallel and are approximately equidistant from the shaft longitudinal axis. Accordingly, each of the roll pins is disposed tangent to a first circle, the first circle having a center that resides along the shaft longitudinal axis.

Each of the tip sections 114 comprises a knurled face 116. A cylindrical collar 122 encircles most of the jaw base sections 112, and a spring 124 resides within the collar. The spring exerts force on the collar, the force having a direction generally away from the shaft 104 and generally toward the knurled faces 116. As best illustrated in an end view provided by FIG. 2B, the jaws 110 project through a slot 118 in the collar 122.

As the collar 122 is pushed in the direction generally away from the shaft 104, it presses against the jaw base sections 112, which generates a clamping force in the jaws 110, the clamping force including the knurled faces 116 being forced toward each other. The grasping device 100 is thus adapted to clamp, grasp, or pinch an object between the knurled faces 116. Notches 117 in the knurled faces further facilitate grasping some objects. In some embodiments, the jaws include a coating or covering comprising resilient material. The resilient material is typically, but not necessarily, natural or synthetic rubber, cork, or natural or synthetic polymeric material. Polymeric material may include, but is not limited to, polyisoprene, elastane, polyester, polyethylene terephthalate (PET), polyolefins such as polyethylene (PE) or polypropylene (PP), polyetheretherketone (PEEK), polyimide, polycarbonate, polyaniline, polyvinyl chloride (PVC), acrylonitrile butadiene styrene (ABS), acrylate or methacrylate polymers, or fluorinated polymers such as polytetrafluoroethylene or polyfluoroethylenepropylene.

Embodiments of the grasping device typically comprise rigid material such as metal alloys, including, but not limited to, steel, aluminum alloys, or titanium alloys. In some embodiments, the grasping device comprises mostly w-grade tool steel, 4130 grade chromoly steel, and spring steel. Jaw faces typically, but not necessarily, include tungsten carbide.

Figure 3A:
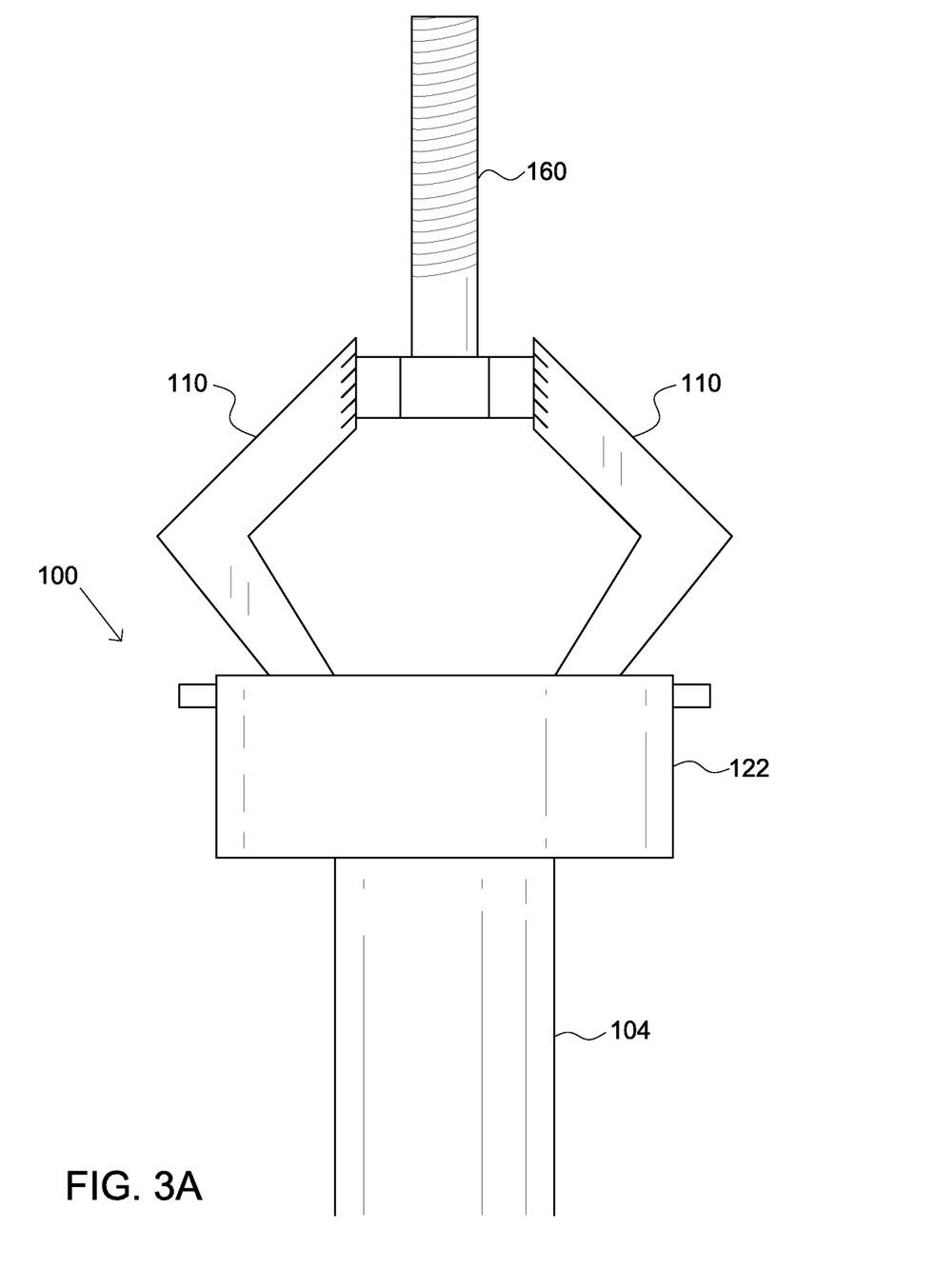
FIG. 3A is a side, pan view of a grasping device for a drill, according to one embodiment of the present invention.

The first embodiment grasping device 100 is illustrated grasping various objects in FIGS. 3A-3D. In FIG. 3A, the grasping device 100 holds a hex head bolt 160 in its jaws 110 by pinching the hex head bolt between the jaws. In some circumstances, the grasping device does not grasp a bolt with sufficient purchase to fully tighten the bolt. However, in many circumstances it is desirable to rotate a bolt, nut, or other threaded fastener for many turns as the fastener engages its threaded counterpart, before force required to rotate the fastener increases substantially as the fastener draws tight. Similarly, once a fastener has been loosened slightly, rotating the fastener to disengage its threaded counterpart requires relatively low torque, and the grasping device grasps with sufficient purchase to perform such loosening.

In some circumstances it is desirable to pull on a fastener as the fastener is turned, either during tightening or loosening of the fastener. Such is the case with a toggle bolt, where a bolt or screw engages a spring loaded wing that typically resides inside a wall, and tension created by pulling on the bolt or screw prevents the wing from turning by pulling the wing against an inside wall surface. Unlike a conventional screwdriver, nut driver, socket, or similar device, the first embodiment grasping device is adapted to pull on a fastener while turning it with a drill.

Figure 3B:
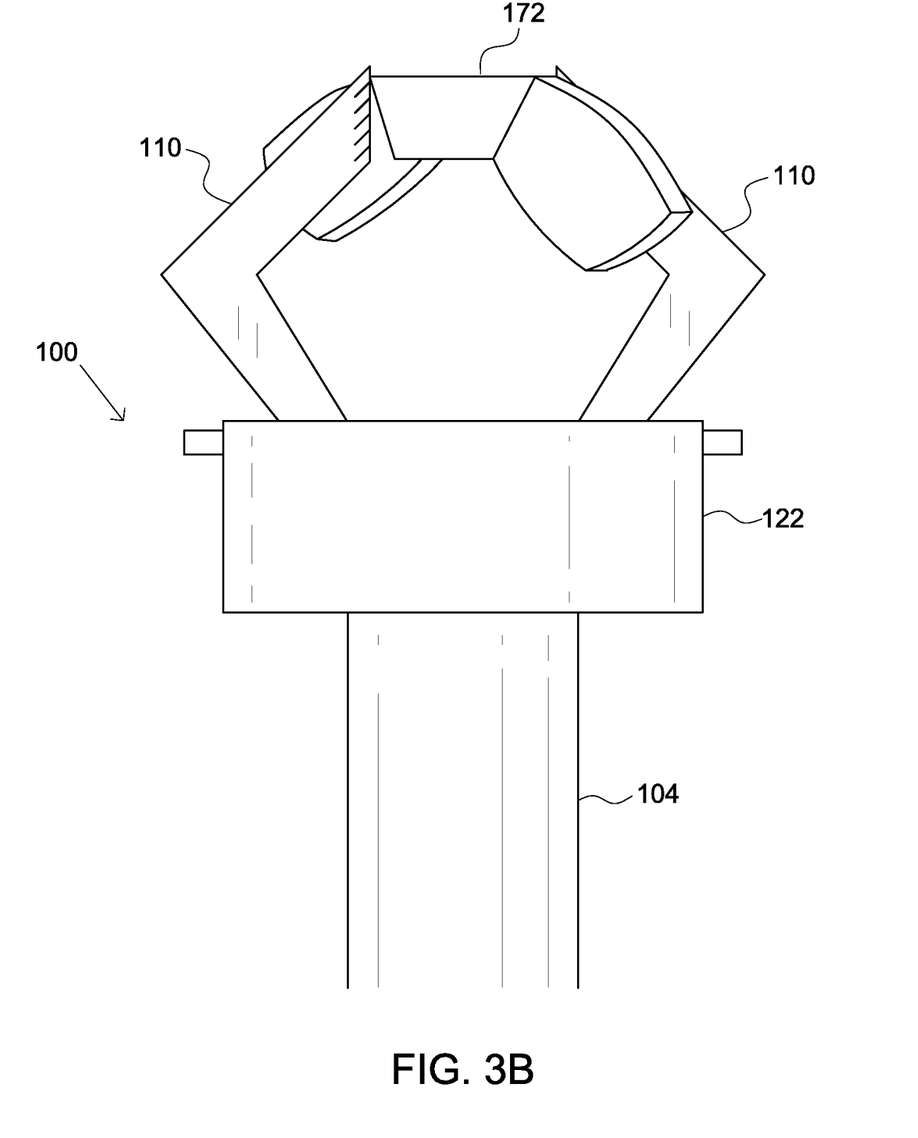
FIG. 3B is a side, pan view of a grasping device for a drill, according to one embodiment of the present invention.

In FIG. 3B, the grasping device 100 is illustrated grasping a wing nut 172 in its jaws. Thus configured, the grasping device, in combination with an electric drill, is adapted to rapidly tighten or loosen the wing nut.

Figure 3C:
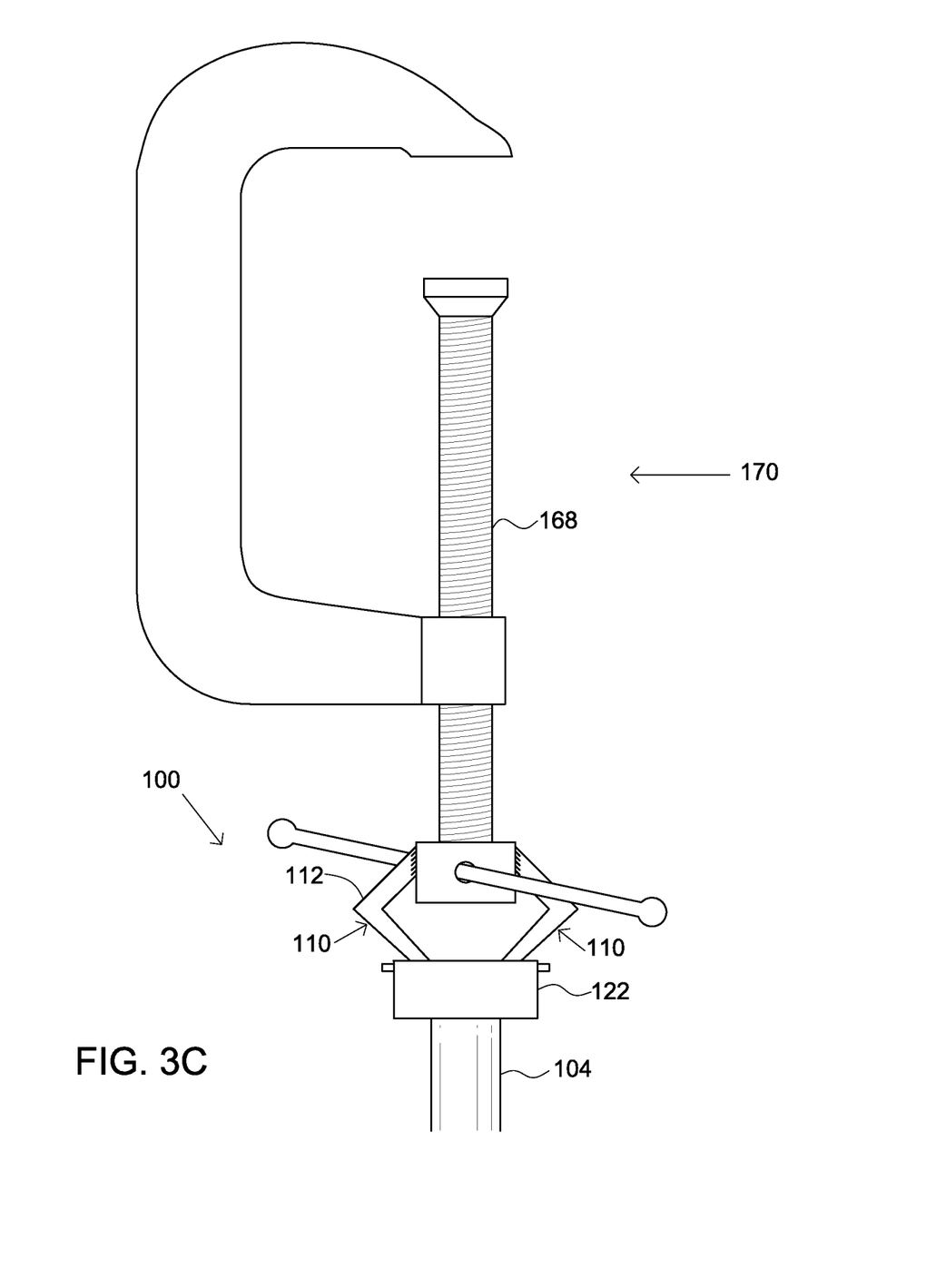
FIG. 3C is a side, pan view of a grasping device for a drill, according to one embodiment of the present invention.

In FIG. 3C, the grasping device 100 is illustrated pinching a threaded screw 168 of a C-clamp 170 between the device jaws 110. The grasping device, in combination with an electric drill, is thus configured to rapidly open or close the C-clamp.

Figure 3D:
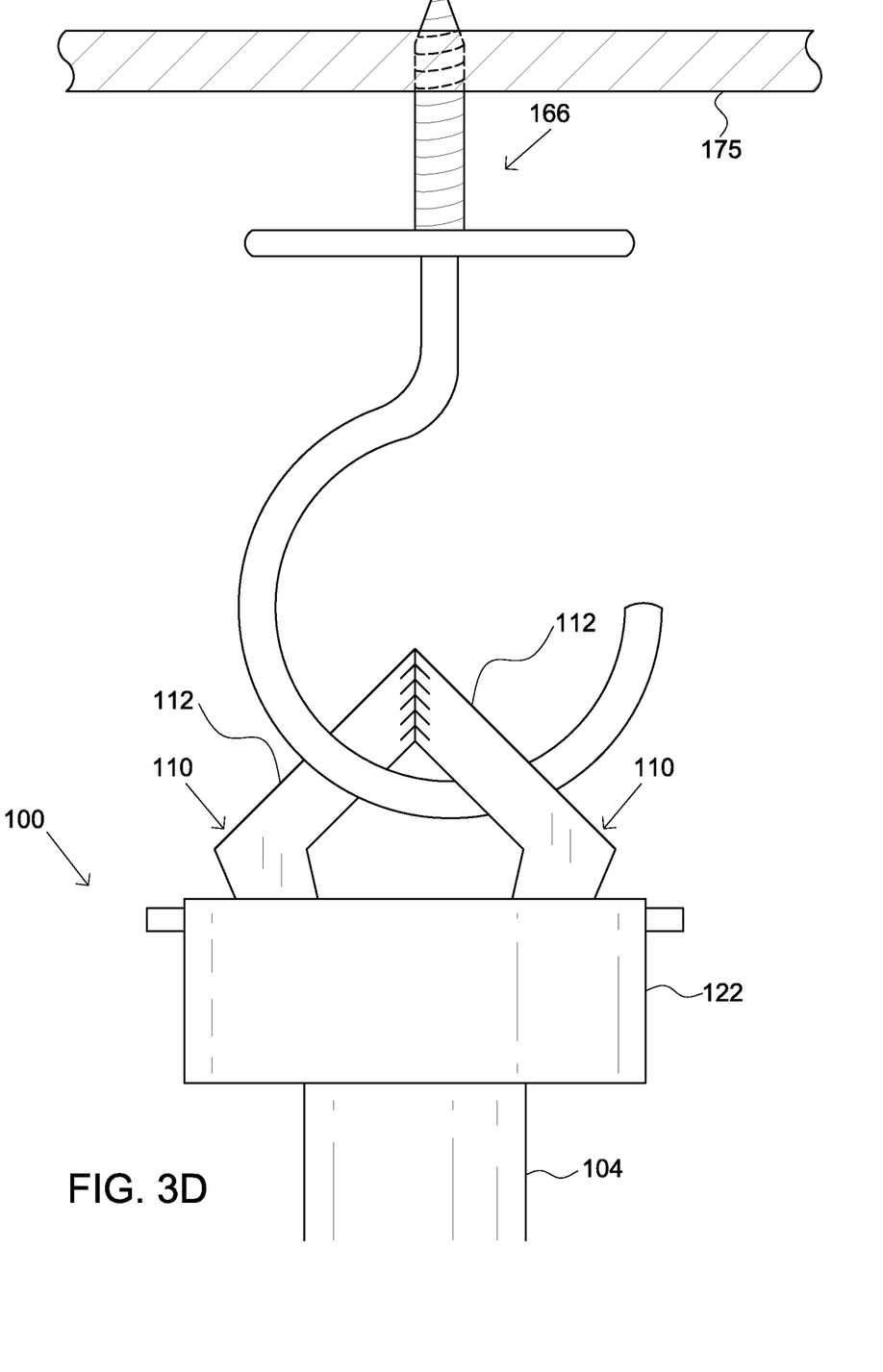
FIG. 3D is a side, pan view of a grasping device for a drill, according to one embodiment of the present invention.

In FIG. 3D, the grasping device 100 is illustrated engaging a threaded hook 166. In this application, the jaws 110 do not pinch the hook between the knurled faces. Rather, the hook wedges against sides of the jaw tip sections 112 as the grasping device rotates. The grasping device is typically capable of applying sufficient torque to fully tighten the threaded hook into a ceiling 175 because its purchase on the hook is not limited by the jaws' ability to grasp the hook between its knurled faces. The wedging action of the grasping device against the hook is appropriate here because the hook is stabilized by its initial penetration of the ceiling. A person skilled in the art recognizes that the grasping device does not actually grasp the hook in FIG. 3D, and the wedging action for tightening a hook or similar item is therefore most appropriate where the hook is stabilized by other means.

A Second Embodiment Grasping Device

Figure 4:
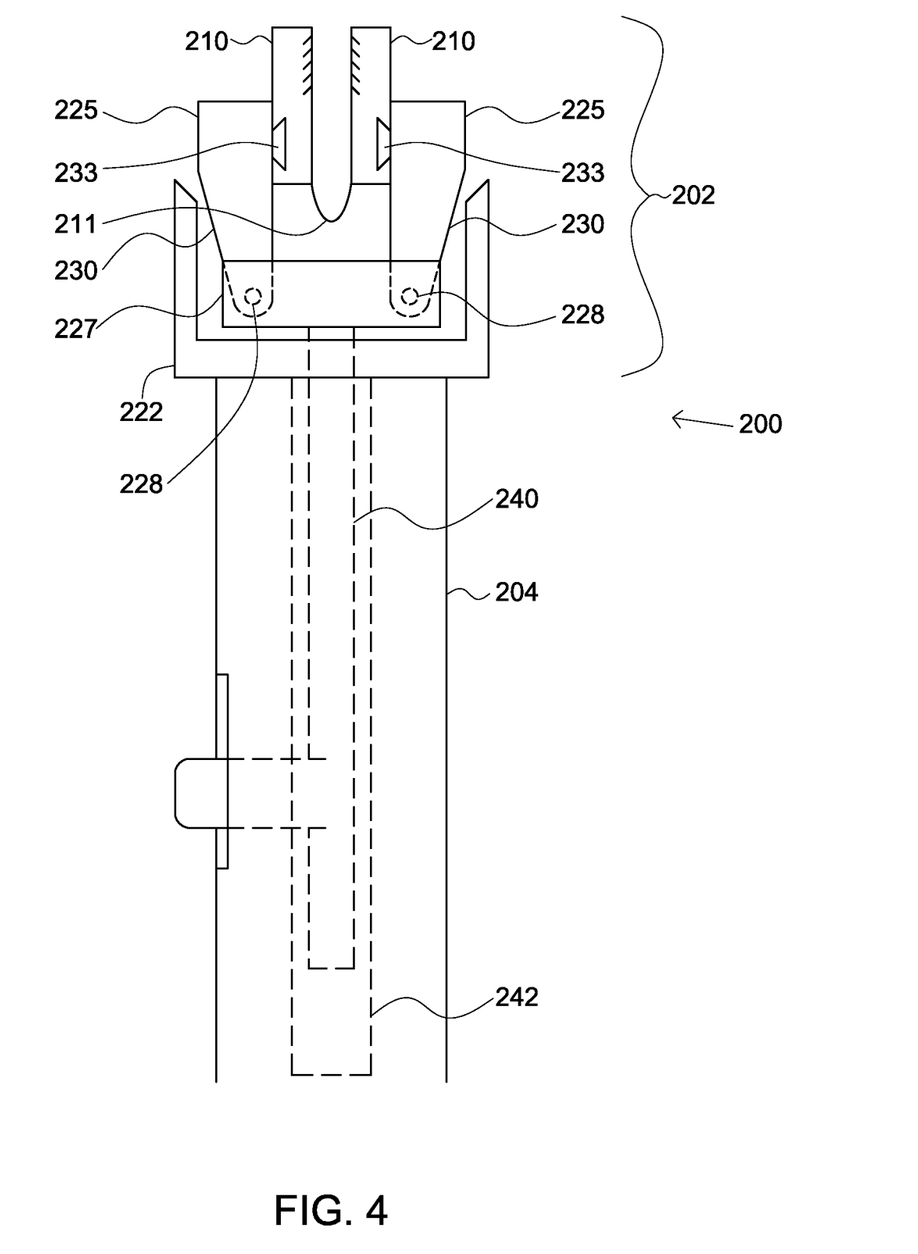
FIG. 4 is a side, pan view of a grasping device for a drill, according to one embodiment of the present invention.
Figure 5A:
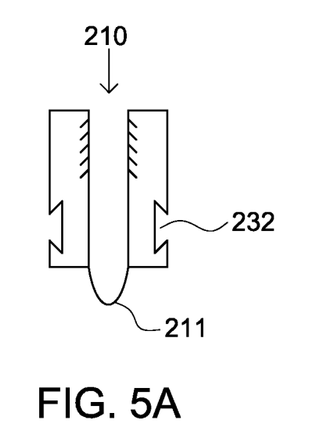
FIG. 5A is a side, pan view of a grasping device for a drill, according to one embodiment of the present invention.

A second embodiment grasping device 200 is illustrated in FIGS. 4 and 5A. The second embodiment grasping device comprises a clamping assembly 202 and shaft 204. The clamping assembly includes two jaws 210 coupled together with a spring steel connector 211. The clamping assembly further comprises two pivoting members 225, each pivoting member being coupled to a base member 227 by roll pins 228 about which the pivoting members pivot. Each pivoting member comprises a beveled section 230 and a notch 232. Flanges 233 disposed on the pivoting members 225 reside in the notches and removably couple the jaws to the pivoting members. The flanges are better viewed without the flanges in FIG. 5A, which illustrates the two jaws 210 and spring steel connector 211 detached from the rest of the grasping device.

The grasping device 200 further comprises a collar 222 and an adjustment post 240, the adjustment post residing mostly in a cavity 242 in the shaft 204. The adjustment post moves longitudinally within the cavity in order to adjust positioning of the clamping assembly 202 relative to the collar 222. The adjustment post includes a button 244 that extends out of the cavity to a location outside the shaft 204. A user can move the adjustment post longitudinally within the cavity by moving the button.

As the clamping assembly 202 moves farther toward or into the collar 222, the collar presses against the beveled sections 230 of the pivoting members 225, causing the pivoting members to pivot toward each other, which in turn presses the jaws 210 toward each other. An object may thus be grasped within the jaws. Conversely, as the clamping assembly extends out of the collar, the collar allows the pivoting members to rotate away from each other, thereby allowing the jaws to move away from each other. Thus the jaws relax their purchase on an object, or open to receive a larger object therebetween.

Figure 5B:
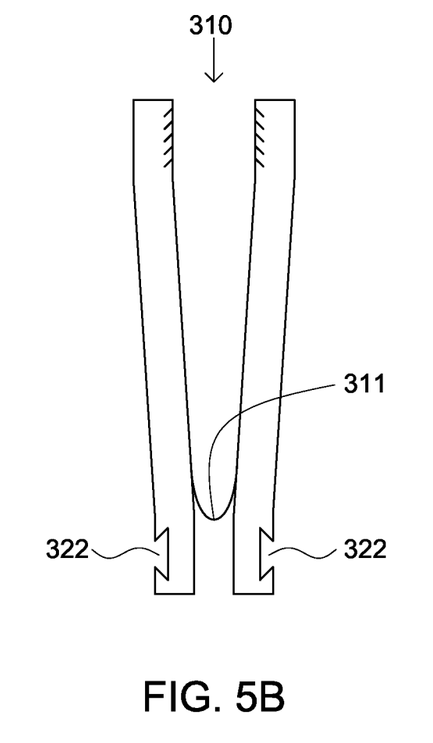
FIG. 5B is a side, pan view of a grasping device for a drill, according to one embodiment of the present invention.

The jaws 210 are readily removable from the grasping device 200 and are readily replaced, and therefore interchangeable with, different jaws. Different jaws 310 are illustrated in FIG. 5B, the different jaws including notches 322 adapted to receive the flanges 233 of the grasping device. The different jaws are larger and shaped differently than the jaws 210. The different jaws are coupled to each other by a spring steel coupler 211 or 311. In some embodiments, the grasping device is adapted to accept any of a collection of interchangeable jaws, the collection of interchangeable jaws including jaws having a variety of shapes and sizes.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

We claim:

1. A grasping device for use with an electric drill, the grasping device comprising:
   a shaft configured to be received in a drill chuck and having a diameter greater than approximately ⅛ inch;
   a grasping assembly including:
   a base member coupled to the shaft;
   two pivoting members pivotably coupled directly to the base member; and
   two first jaws, one of the two first jaws being removably coupled to each of the two pivoting members.

2. The grasping device of claim 1, wherein the two jaws are coupled together by a spring steel connector.

3. The grasping device of claim 1, further comprising two second jaws, the two second jaws being interchangeable with the two first jaws on the two pivoting members.

4. The grasping device of claim 2, further comprising a collar encircling the two pivoting members.

5. The grasping device of claim 2, further comprising an adjustable post, wherein:
   the grasping assembly is coupled directly to the adjustable post;
   a portion of the adjustable post resides in a cavity in the shaft and is configured to move longitudinally within the cavity.

6. A combination comprising:
   the grasping device of claim 4;
   an electric drill comprising a chuck, the grasping device shaft being secured within the drill chuck.

* * * * *